US009065330B1

(12) United States Patent
Peng et al.

(10) Patent No.: US 9,065,330 B1
(45) Date of Patent: Jun. 23, 2015

(54) METHOD AND APPARATUS FOR CONTROLLING TRIAC DIMMABLE DEVICE

(71) Applicant: Marvell International Ltd., Hamilton (BM)

(72) Inventors: Hao Peng, Sunnyvale, CA (US); Jinho Choi, Saratoga, CA (US); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 6 days.

(21) Appl. No.: 13/676,884

(22) Filed: Nov. 14, 2012

Related U.S. Application Data

(60) Provisional application No. 61/560,208, filed on Nov. 15, 2011.

(51) Int. Cl.
*H02M 5/42* (2006.01)
*H02M 7/12* (2006.01)

(52) U.S. Cl.
CPC ...................................... *H02M 7/12* (2013.01)

(58) Field of Classification Search
CPC .. H02M 1/4208; H02M 7/217; H02M 1/4225
USPC ............................ 363/78, 84, 89, 79, 125–129
See application file for complete search history.

(56) References Cited

U.S. PATENT DOCUMENTS

| 5,513,089 | A  | * | 4/1996  | Sudo et al. ................. 363/21.11 |
| 5,838,226 | A  | * | 11/1998 | Houggy et al. ............ 340/12.32 |
| 8,242,766 | B2 | * | 8/2012  | Gaknoki et al. ............... 323/300 |
| 8,379,412 | B2 | * | 2/2013  | Nakayama ................. 363/21.01 |
| 2010/0164579 | A1 | * | 7/2010 | Acatrinei ...................... 327/172 |
| 2010/0165668 | A1 |   | 7/2010 | Lin |
| 2010/0259196 | A1 | * | 10/2010 | Sadwick et al. .............. 315/309 |
| 2011/0140620 | A1 |   | 6/2011 | Lin et al. |
| 2011/0157942 | A1 | * | 6/2011 | Babcock et al. ............. 363/126 |
| 2012/0032649 | A1 | * | 2/2012 | Carmen ........................ 320/166 |
| 2012/0056548 | A1 |   | 3/2012 | Duan et al. |
| 2012/0155132 | A1 |   | 6/2012 | Uno |
| 2012/0169240 | A1 | * | 7/2012 | Macfarlane .................... 315/152 |
| 2012/0230073 | A1 | * | 9/2012 | Newman et al. .............. 363/126 |
| 2013/0336019 | A1 |   | 12/2013 | Gaknoki et al. |

OTHER PUBLICATIONS

"Maestro," from Wikipedia, the free encyclopedia (2 pp.), printed on Jan. 25, 2012.
"TRIAC," from Wikipedia, the free encyclopedia (10 pp.), printed on Jan. 25, 2012.

* cited by examiner

*Primary Examiner* — Adolf Berhane
*Assistant Examiner* — Kevin H Sprenger

(57) ABSTRACT

Aspects of the disclosure provide a method that including receiving a sensed signal corresponding to a current flowing through an energy transfer module in response to an on/off state of a forward-type triode for alternating current (TRIAC), determining the TRIAC on/off state based on the sensed signal, and controlling the energy transfer module based on the determined TRIAC on/off state.

17 Claims, 7 Drawing Sheets

METHOD AND APPARATUS FOR CONTROLLING TRIAC DIMMABLE DEVICE

INCORPORATION BY REFERENCE

This present disclosure claims the benefit of U.S. Provisional Application No. 61/560,208, "Universal Control Method for Triac Dimmable LED Driver in Triac Existing Condition" filed on Nov. 15, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Forward-type triode for alternating current (TRIAC) based dimmers are widely used to control the output characteristics of electrical and electronic devices. In an example, a TRIAC based dimmer is used to change light output from a lighting device. In another example, a TRIAC based dimmer is used to change rotation speed of a fan. Further, a TRIAC based dimmer can include a receiver to receive a remote control signal, such that the dimmer is remote controllable. The TRIAC in the dimmer provides power to the receiver even when the dimmer is turned off.

SUMMARY

Aspects of the disclosure provide a method that includes receiving a sensed signal corresponding to a current flowing through an energy transfer module in response to an on/off state of a forward-type triode for alternating current (TRIAC), determining the TRIAC on/off state based on the sensed signal, and controlling the energy transfer module based on the determined TRIAC on/off state.

To determine the TRIAC on/off state based on the sensed signal, in an example, the method includes providing the sensed signal to a state machine that transitions between the TRIAC on state and the TRIAC off state based on the sensed signal.

According to an aspect of the disclosure, to control the energy transfer module based on the determined TRIAC on/off state, the method includes providing a pulse width modulation (PWM) signal to control a switch of the energy transfer module. Further, the method includes controlling the energy transfer module to maintain a minimum current for the TRIAC when the determined state is the TRIAC on state and controlling the energy transfer module to discharge a capacitor when the determined state is the TRIAC off state.

In addition, the method includes controlling the energy transfer module to limit a peak current when the determined state is the TRIAC on state. In an example, the method includes detecting a voltage in the energy transfer module, and controlling a switch in the energy transfer module based on the detected voltage in a quasi-resonant switching manner.

Aspects of the disclosure also provide a circuit including a controller. The controller is configured to receive a sensed signal corresponding to a current flowing through an energy transfer module in response to an on/off state of a forward-type triode for alternating current (TRIAC), determine the TRIAC on/off state based on the sensed signal, and control the energy transfer module based on the determined TRIAC on/off state. In an example, the controller includes a state machine that transitions between the TRIAC on state and the TRIAC off state based on the sensed signal.

Aspects of the disclosure also provide an apparatus. The apparatus includes an energy transfer module, a current sensor and a controller. The energy transfer module is configured to transfer electric energy received via a forward-type triode for alternating current (TRIAC) to an output device. The current sensor is configured to sense a current flowing through the energy transfer module. The controller is configured to determine a TRIAC on/off state based on the sensed current, and control the energy transfer module based on the determined TRIAC on/off state.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
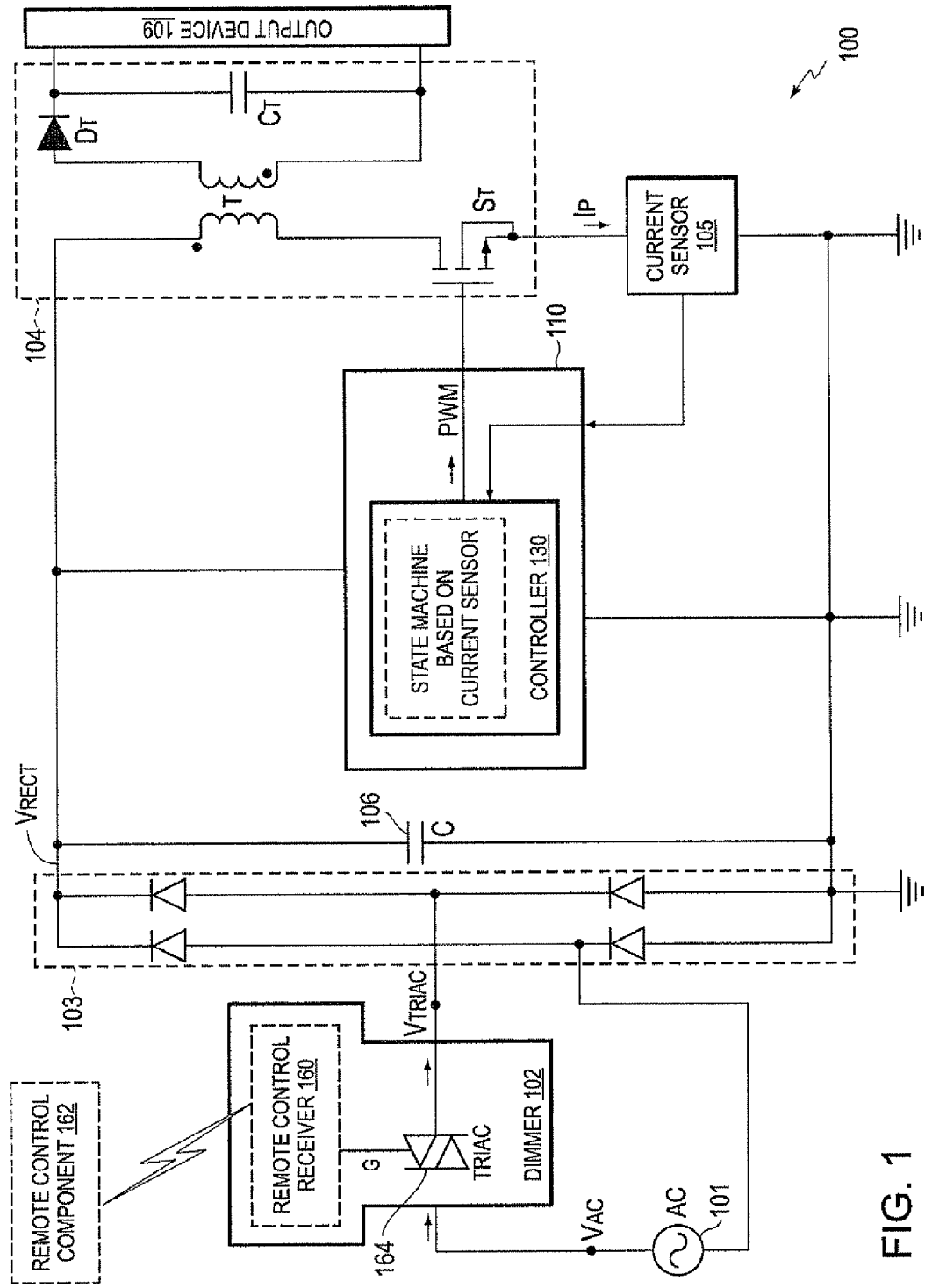
FIG. 1 shows a block diagram of an electronic system 100 according to an embodiment of the disclosure.

FIG. 1 shows a block diagram of an electronic system 100 according to an embodiment of the disclosure. The electronic system 100 operates under an alternating current (AC) voltage $V_{AC}$ provided by an AC power supply 101. The AC voltage $V_{AC}$ can be 110V AC supply voltage, 220V AC supply voltage, and the like. The electronic system 100 includes a dimmer 102, a rectifier 103, a capacitor 106, a circuit 110, an energy transfer module 104, a current sensor 105, and an output device 109. These elements are coupled together as shown in FIG. 1.

The dimmer 102 is a forward-type triode for alternating current (TRIAC) based dimmer that includes a TRIAC 164 having an adjustable dimming angle α. The dimming angle α defines a size of a phase range that the TRIAC 164 is in a TRIAC off state. During an AC cycle, when the phase of the AC voltage $V_{AC}$ is in the phase range, the TRIAC 164 is in the TRIAC off state. Thus, an output voltage $V_{TRIAC}$ of the dimmer 102 is about zero. When the phase of the AC voltage $V_{AC}$ is out of the phase range, the TRIAC 164 is in a TRIAC on state. Thus, the output voltage $V_{TRIAC}$ of the dimmer 102 is about the same as the AC voltage $V_{AC}$.

Operations of the TRIAC 164 require system implementation support in the electronic system 100. For example, when the TRIAC 164 turns on, the electronic system 100 needs to provide a current path to flow at least a minimum current for the operation of the TRIAC 164; and when the TRIAC 164 turns off, the electronic system 100 needs to sufficiently discharge capacitors coupled with the TRIAC 164 to enable the TRIAC 164 to successfully turn on in the next time.

However, different types of TRIAC 164 may turn-on and turn-off at different portions of the AC cycle. For example, a leading edge TRIAC 164 enters the TRIAC off state when the AC voltage $V_{AC}$ is about zero; and a trailing edge TRIAC 164 exits the TRIAC off state when the AC voltage $V_{AC}$ is about zero.

According to an aspect of the disclosure, the electronic system 100 is configured to automatically detect the TRIAC on state and the TRIAC off state of the TRIAC 164 and then operates accordingly to enable the operations of the TRIAC 164.

In the FIG. 1 example, the dimmer 102 is configured to control electric energy from the AC power supply 101 to the electronic system 100, and thus controls an output power of the output device 109. In an example, the dimmer 102 includes an on/off switch (not shown) to turn on/off the dimmer 102. When the dimmer 102 is turned on, electric energy is provided to the output device 109 according to the dimmer angle α of the TRIAC 164. When the dimmer 102 is turned off, the dimmer 102 stops providing electric energy to the output device 109.

In another example, the dimming angle α of the TRIAC 164 is adjustable in a range from a minimum level to a maximum level. When the dimmer angle α is at the maximum level of the range, the output power of the output device 109 is about zero and the output device 109 is turned off; otherwise, the output device 109 is turned on, and the dimming angle α can be adjusted to adjust the output power of the output device 109. When the dimmer angle α is adjusted at the minimum level of the range, the output power of the output device 109 is maximized.

In addition, in an example, the dimmer 102 is a remote controllable dimmer that includes a remote control receiver 160. The remote control receiver 160 can listen to control signals from a remote control component 162. In an embodiment, the remote control receiver 160 can be powered by a Maestro type TRIAC 164 with a dedicated time duration in each AC cycle to charge the remote control receiver 160, no matter the dimmer 102 is turned on or off.

The rectifier 103 rectifies an AC voltage to a fixed polarity, such as to be positive. In the FIG. 1 example, the rectifier 103 is a bridge rectifier 103. The bridge rectifier 103 receives the output voltage $V_{TRIAC}$ of the dimmer 102, and rectifies the received voltage to a fixed polarity, such as to be positive. The capacitor 106 filters out high frequency components and smoothes the rectified voltage $V_{RECT}$. The rectified voltage $V_{RECT}$ is provided to following circuits, such as the circuit 110, the energy transfer module 104, and the like in the electronic system 100.

The energy transfer module 104 transfers electric energy provided by the rectified voltage $V_{RECT}$ to the output device 109 under the control of the circuit 110. In the FIG. 1 example, the energy transfer module 104 includes a transformer T and a switch $S_T$. The energy transfer module 104 also includes other suitable components, such as a diode $D_T$, a capacitor $C_T$, and the like. The transformer T includes a primary winding coupled with the switch $S_T$ to receive the rectified voltage $V_{RECT}$ and a secondary winding coupled to the output device 109 to drive the output device 109.

In an embodiment, the circuit 110 provides control signals to control the operations of the switch $S_T$ to transfer the electric energy from the primary winding to the secondary winding. In an example, the circuit 110 provides a pulse width modulation (PWM) signal with pulses having a relatively high frequency to control the switch $S_T$. The relatively high frequency pulses enable power factor correction (PFC) for the AC power supply.

Specifically, in an example, when the switch $S_T$ is switched on, a current $I_P$ flows through the primary winding of the transformer T, and the switch $S_T$. The polarity of the transformer T and the direction of the diode $D_T$ can be arranged, such that there is no current in the secondary winding of the transformer T when the switch $S_T$ is switched on. Thus, the received electric energy is stored in the transformer T.

When the switch $S_T$ is switched off, the current $I_P$ becomes zero. The polarity of the transformer T and the direction of the diode $D_T$ can enable the secondary winding to deliver the stored electric energy to the output device 109.

The output device 109 can be any suitable device, such as a light bulb, a plurality of light emitting diodes (LEDs), a fan and the like.

The current sensor 105 is configured to sense the current $I_P$ flowing through the primary winding, and provide the sensed current to the circuit 110. In an example, the current sensor 105 includes a resistor having a relatively small resistance, such that a voltage drop on the resistor is small compared to the rectified voltage $V_{RECT}$. The voltage drop is indicative of the current $I_P$. In an example, the voltage drop is provided to the circuit 110 as the sensed current.

According to an embodiment of the disclosure, the circuit 110 includes a controller 130. The controller 130 is configured to receive the sensed current, and detect the state of the TRIAC 164, such as the TRIAC on state and TRIAC off state, based on the sensed current. Further, the controller 130 adjusts the control signals, such as the PWM signal, and the like, to control the operations of the energy transfer module 104 based on the detected state to enable the operations of the TRIAC 164.

Specifically, in an example, the controller 130 includes a state machine that operates based on the sensed current by the current sensor 105. For example, the state machine includes at least a first state corresponding to TRIAC on state and a second state corresponding to TRIAC off state. Based on the state of the state machine at a particular time, the controller 130 detects the TRIAC state at the time, and also controls the operations of the energy transfer module 104 at the time.

For example, when the state machine is in the first state, the controller 130 determines that the TRIAC 164 is in the TRIAC on state. In the first state, the controller 130 provides the control signals to the switch $S_T$ in a manner to enable the TRIAC 164 to operate in the TRIAC on state. For example, the control signals enable the electronic system 100 to maintain a minimum current. Further, the controller 130 receives the sensed current, and determines whether the TRIAC 164 turns off based on the sensed current. When the sensed current is indicative of TRIAC 164 being off, the state machine transitions into the second state.

When the state machine is in the second state, the controller 130 determines that the TRIAC 164 is in the TRIAC off state. In the second state, the controller 130 provides the control signals to the switch $S_T$ in a manner to enable the TRIAC 164 to operate in the TRIAC off state. For example, the control signals enable the capacitor 106 to be sufficiently discharged. Further, the controller 130 receives the sensed current, and determines whether the TRIAC 164 turns on based on the sensed current. When the sensed current is indicative of TRIAC 164 being on, the state machine enters the first state.

It is noted that the electronic system 100 can be implemented by various techniques. In an embodiment, the dimmer 102 is an existing device installed on a power grid of a house. The other components of electronic system 100 can be assembled in a device. The device is then electrically coupled with the dimmer 102. In another embodiment, the dimmer 102 is assembled with the other components in a device.

It is also noted that the electronic system 100 can be implemented using one or more integrated circuit (IC) chips. In an example, the circuit 110 is implemented as a single IC chip. Further, the switch $S_T$ can be implemented as a discrete device or can be integrated with the circuit 110 on the same IC chip.

Figure 2:
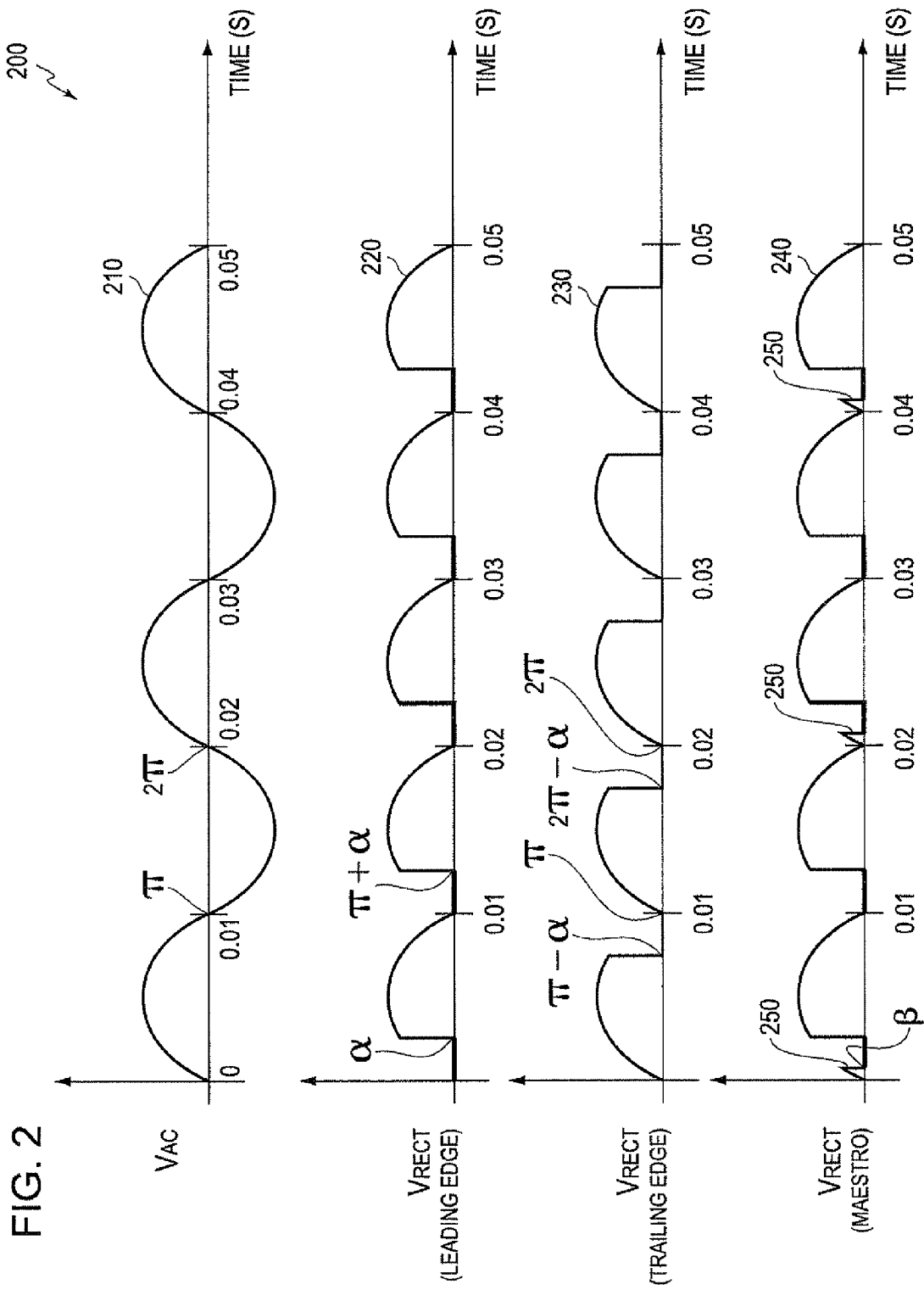
FIG. 2 shows a plot 200 of waveforms for the electronic system 100 according to an embodiment of the disclosure.

FIG. 2 shows a plot 200 of waveforms for the electronic system 100 according to an embodiment of the disclosure. The plot 200 includes a first waveform 210 for the AC supply voltage $V_{AC}$, a second waveform 220 for the rectified voltage $V_{RECT}$ when the TRIAC 164 is a leading edge TRIAC, a third waveform 230 for the rectified voltage $V_{RECT}$ when the TRIAC 164 is a trailing edge TRIAC, and a fourth waveform 240 for the rectified voltage $V_{RECT}$ when the TRIAC 164 is a Maestro TRIAC.

As can be seen in FIG. 2, the AC voltage $V_{AC}$ has a sinusoidal waveform, and has a frequency of 50 Hz. The rectified voltage $V_{RECT}$ has positive polarity due to the operation of the rectifier 103.

The TRIAC 164 has a dimming angle $\alpha$. Different types of TRIAC turn on and off at different phases in an AC cycle.

When the TRIAC 164 is a leading edge TRIAC, the TRIAC 164 enters the TRIAC off state when the AC voltage $V_{AC}$ is about zero. For example, in each AC cycle [0, $2\pi$], the AC voltage $V_{AC}$ is about zero at 0 and $\pi$. Thus, the TRIAC 164 turns off at 0 and $\pi$. As can be seen by the waveform 220, the rectified voltage $V_{RECT}$ is about zero during [0, $\alpha$] and [$\pi$, $\pi+\alpha$].

When the TRIAC 164 is a trailing edge TRIAC, the TRIAC 164 exits the TRIAC off state when the AC voltage $V_{AC}$ is about zero. For example, in each AC cycle [0, $2\pi$], the AC voltage $V_{AC}$ is about zero at 0 and $\pi$. Thus, the TRIAC 164 turns on at 0 and $\pi$. As can be seen by the waveform 230, the rectified voltage $V_{RECT}$ is about zero during [$\pi-\alpha$, $\pi$] and [$2\pi-\alpha$, $2\pi$].

When the TRIAC 164 is a Maestro TRIAC, the TRIAC 164 has a phase range independent of the dimming angle $\alpha$ to charge the remote control receiver 160. For example, the Maestro TRIAC 164 is based on a leading edge TRIAC, thus the waveform 240 is similar to the waveform 220. In addition, the TRIAC 164 turns on in a phase range, such as [0, $\beta$], to charge the remote control receiver 160. Generally, $\beta$ is much smaller than $\alpha$. As can be seen in waveform 240, the rectified voltage $V_{RECT}$ is non-zero during a phase range [0, $\beta$] in each AC cycle [0, $2\pi$], as shown by 250.

Figure 3:
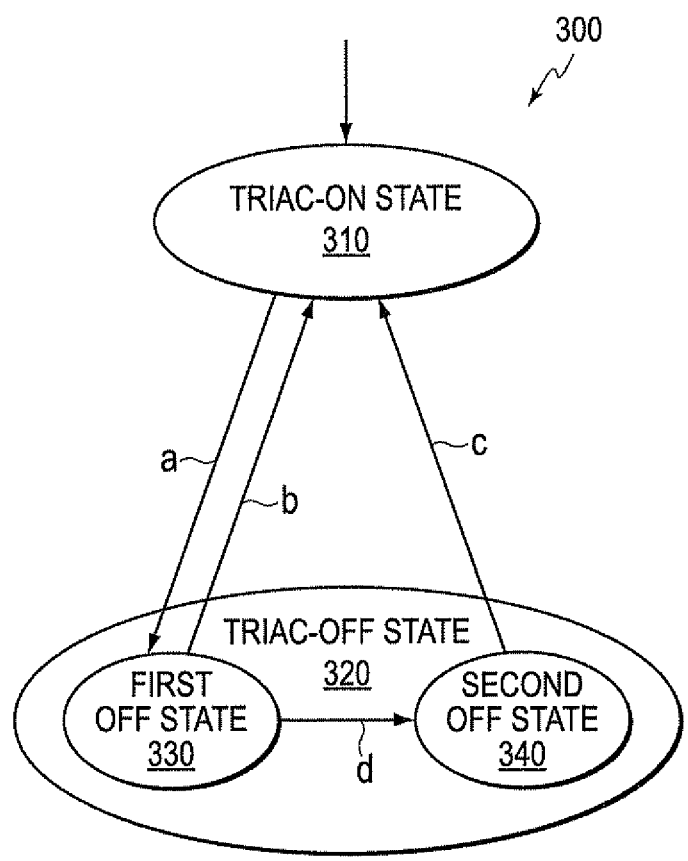
FIG. 3 shows a state diagram for a state machine example 300 according to an embodiment of the disclosure.

FIG. 3 shows a state diagram for a state machine example 300 according to an embodiment of the disclosure. The state machine 300 can be used in the controller 130 to enable the operations of the electronic system 100. The state machine 300 includes a TRIAC on state 310 and a TRIAC off state 320. The TRIAC off state 320 further includes a first off state 330 and a second off state 340.

When the state machine 300 is in the TRIAC on state 310, the controller 130 provides the PWM signal to the switch $S_T$ in a first configuration. The PWM signal repetitively turns on and off the switch $S_T$. The switch $S_T$ is turned on to allow a current path coupled with the TRIAC 164, is turned off to limit the current $I_P$ below a threshold. For example, at a time, the controller 130 changes the PWM signal from "0" to "1" to turn on the switch $S_T$. When the switch $S_T$ is turned on, the current $I_P$ starts to increase. The current sensor 105 senses the current $I_P$, for example, in a form of a voltage drop on a resistor, and provides sensed voltage to the controller 130. The controller 130 receives the sensed voltage, and changes the PWM signal from "1" to "0" to turn off the switch $S_T$ when the sensed voltage is substantially equal to a threshold, such as 0.4V, and the like.

It is noted that the controller 130 also controls the PWM signal based on other parameters, such as a maximum on time (i.e., 10 $\mu$s), a minimum frequency (i.e., 70 KHz), a maximum frequency (i.e., 200 KHz), and the like. For example, when the rectified voltage $V_{RECT}$ is relatively small, the controller 130 changes the PWM signal from "1" to "0" when a turn-on time is about 10 $\mu$s even though the sensed voltage is less than the threshold.

In another example, the controller 130 uses a quasi-resonant control method. According to the quasi-resonant control method, a frequency of the PWM signal is not fixed, and is synchronized with a resonance frequency governed by inductance and capacitance in the electronic system 100. In this example, a voltage across the secondary winding of the transformer T is sensed and provided to the controller 130. When the switch $S_T$ is turned off, the voltage across the secondary winding resonates. The controller 130 changes the PWM signal from "0" to "1" when the voltage across the secondary winding is at the valley. In addition, the controller 130 also limits the frequency of the PWM signal between the minimum frequency and the maximum frequency.

In the FIG. 3 example, in the TRIAC on state 310, if the sensed current satisfies a condition (a), the state machine 300 transits to the TRIAC off state 320. In an embodiment, when the sensed voltage is lower than a threshold, such as 0.25V, in a plurality of pulses, such as 3 consecutive pulses, the state machine 300 then enters the TRIAC off state 320. In an example, the state machine 300 enters the first off state 330 first, and then enters the second off state when a time duration satisfies condition (d). In an example, the state machine 300 enters the second off state 340 from the first off state 330 when the time duration in the first off state 330 is over half of a total TRIAC off time. The total TRIAC off time can be determined based on a previous time duration that the state machine 330 is in the TRIAC off state 320.

When the state machine 300 is in the TRIAC off state 320, the controller 130 provides the PWM signal to the switch $S_T$ in a second configuration. In the second configuration, the controller 130 provides the PWM signal in a manner to sufficiently turn on the switch $S_T$ to discharge capacitors. For example, the controller 130 provides the PWM signal with a large duty cycle such that the switch $S_T$ is turned on most of the time to allow capacitors, such as the capacitor 106, and the like to discharge. In an example, the controller 130 uses a relatively small fixed off time, such as 0.8 $\mu$s, and a max on time, such as 7.2 $\mu$s to control the width of the PWM signal. Thus, the PWM signal has a duty cycle of 90%.

In addition, the controller 130 can apply other conditions to control the width of the PWM signal. For example, the controller 130 limits the sensed voltage, which is indicative of the current $I_P$, to a threshold, such as 0.4V, and the like. It is noted that when the TRIAC 164 is in the TRIAC off state, the sensed voltage is generally about zero and is lower than the threshold, thus the current limit condition does not take effect on the PWM signal. However, when the TRIAC 164 turns on, the current limit condition can prevent negative effect due to excess current.

In the FIG. 3 example, in the first off state 330, if the sensed current satisfies a condition (b), the state machine 300 transits to the TRIAC on state 310. In an example, when the sensed voltage is over a relatively low threshold, such as 0.6V, the state machine 300 transits to the TRIAC on state 310. In a situation that the state machine 300 transits into the TRIAC off state 320 by accidently due to unforeseeable reason, the relatively low threshold used in the condition (b) enables the state machine 300 to return the TRIAC on state 310 quickly to prevent negative effect.

In the second off state, if the sensed current satisfies a condition (c), the state machine 300 transits to the TRIAC on state 310. In an example, when the sensed voltage is over a relatively large threshold, such as 0.6V, the state machine 300 transits to the TRIAC on state 310. The relatively large threshold used by the condition (d) enables the state machine 300 to reduce false transitions due to noise, for example.

It is noted that the state machine 300 can be implemented by various techniques. In an example, the state machine 300 is implemented as integrated circuit. In another example, the state machine 300 is implemented as software instructions to be executed by a processor.

Figure 4:
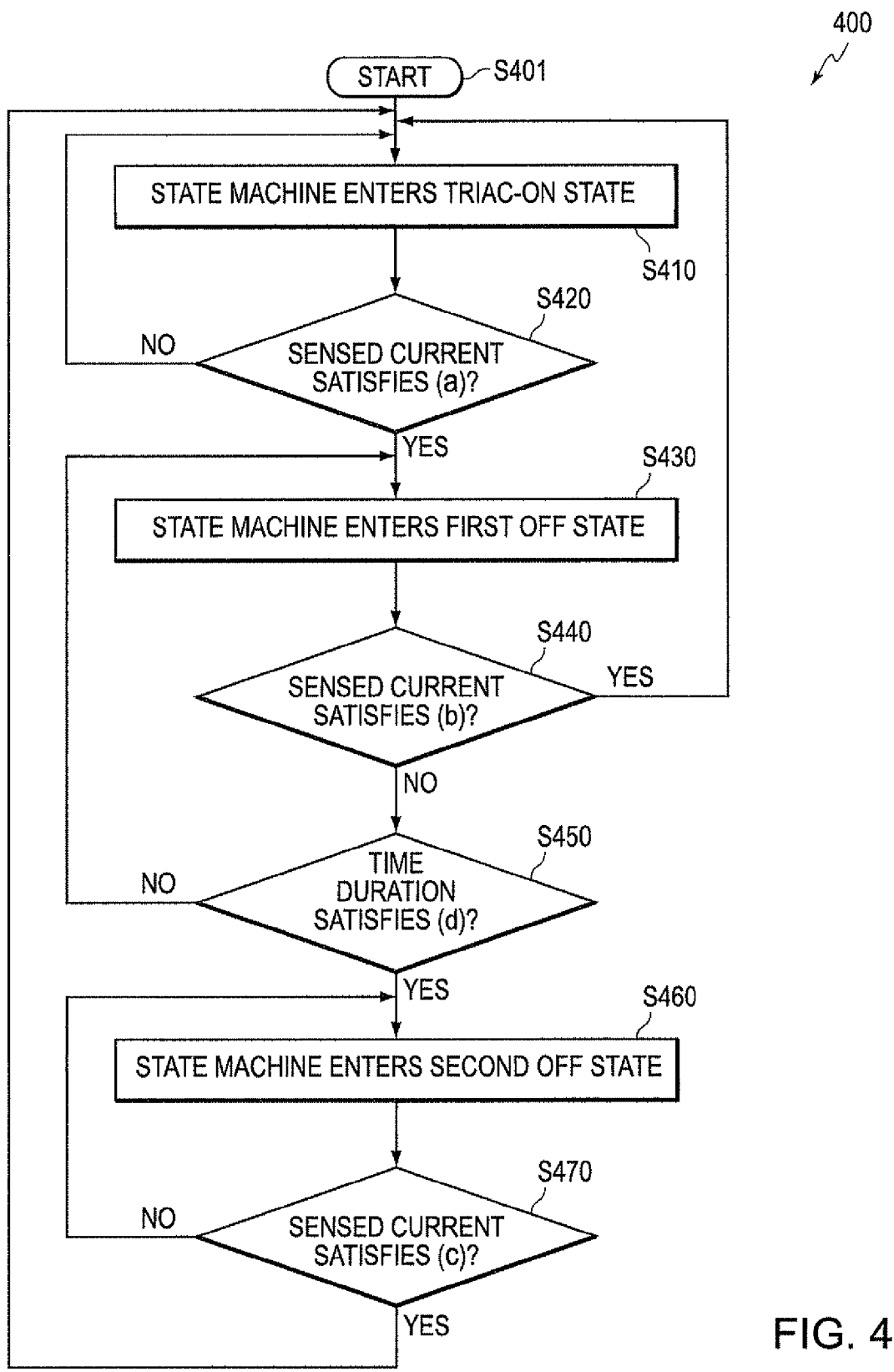
FIG. 4 shows a flow chart outlining a process example 400 executed in the state machine 300 according to an embodiment of the disclosure.

FIG. 4 shows a flow chart outlining a process example 400 executed in the state machine 300 according to an embodiment of the disclosure. The process starts at S401 and proceeds to S410.

At S410, the state machine 300 enters the TRIAC on state 310. In an example, the TRIAC on state 310 is a default initialization state. When the state machine 300 starts, for example at power-up, the state machine 300 enters the TRIAC on state 310. In the TRIAC on state 310, the controller 130 provides the PWM signal to the switch $S_T$ in the first configuration described above.

At S420, the sensed current by the current sensor 105 is used to determine whether the condition (a) is satisfied. When the sensed current satisfies the condition (a), the process proceeds to S430; otherwise, the process returns to S410 that the state machine 300 stays in the TRIAC on state.

At S430, the state machine 300 enters the first off state 330. In the first off state 330, the controller 130 provides the PWM signal to the switch $S_T$ in the second configuration described above.

At S440, the sensed current by the current sensor 105 is used to determine whether the condition (b) is satisfied. When the sensed current satisfied the condition (b), the process returns to S410, and the state machine 300 returns to the TRIAC on state; otherwise, the process proceeds to S450.

At S450, a time duration that the state machine 300 is in the first off state 330 is used to determine whether the condition (d) is satisfied. In an example, a previous total TRIAC-off time is used in the condition (d). For example, the condition (d) determines whether the time duration is larger than a half of the previous total TRIAC off time. When the time duration satisfies the condition (d), the process proceeds to S460; otherwise, the process returns to S430, and the state machine 300 stays in the first off state 330.

At S460, the state machine 300 enters the second off state 340. In the second off state 340, the controller 130 provides the PWM signal to the switch $S_T$ in the second configuration as described above.

At S470, the sensed current by the current sensor 105 is used to determine whether the condition (c) is satisfied. When the sensed current satisfies the condition (c), the process returns to S410 where the state machine 300 enters the TRIAC on state 310; otherwise, the process returns to S460 where the state machine 300 stays in the second off state 340.

Figure 5:
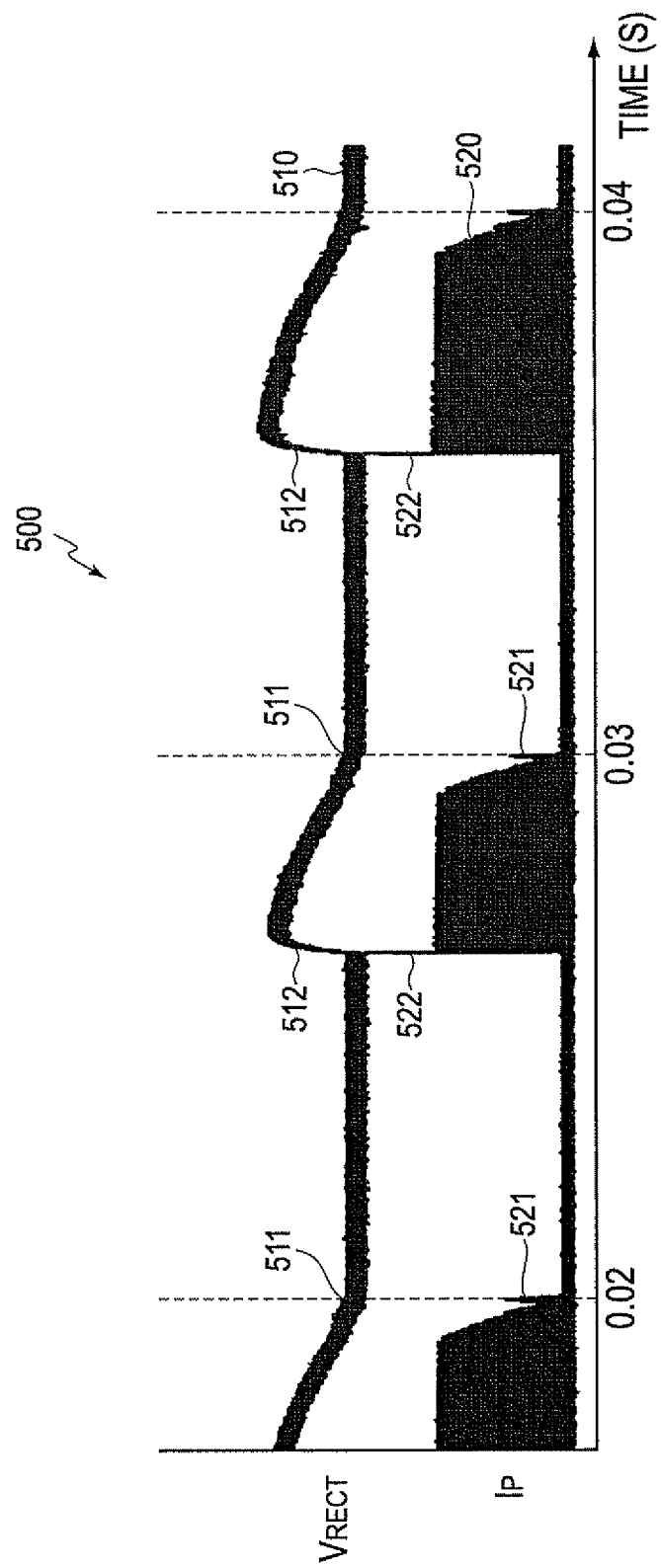
FIG. 5 shows a plot 500 of voltage and current measurements in an electronic system 100 having a leading edge TRIAC 164.

FIG. 5 shows a plot 500 of voltage and current measurements in an electronic system 100 having a leading edge TRIAC 164. The plot 500 includes a first waveform 510 of the rectified voltage $V_{RECT}$, and a second waveform 520 of the sensed voltage corresponding to the current $I_P$.

When the TRIAC 164 is in the TRIAC on state, the rectified voltage $V_{RECT}$ is larger than zero, and the controller 130 provides the PWM signal in a manner to limit a peak value for the current $I_P$. As can be seen, the sensed voltage corresponding to the current $I_P$ has a peak voltage, such as 0.4V.

When the TRIAC 164 turns off, the rectified voltage $V_{RECT}$ is about zero, as can be seen by 511. The sensed voltage is less than, for example 0.25V, for a plurality of pulses, as seen by 521, the controller 130 determines that the TRIAC 164 turns off, and then provides the PWM signal in a manner to sufficiently discharge capacitors.

When the TRIAC 164 turns on, the rectified voltage $V_{RECT}$ increases, as seen by 512, and causes the current $I_P$ to increase, as seen by 522. When the sensed voltage corresponding to the current $I_P$ is larger than a threshold (i.e., 0.6V), as seen by 521, the controller determines that the TRIAC 164 turns on, and then provides the PWM signal in the manner to limit the peak value for the current $I_P$.

Figure 6:
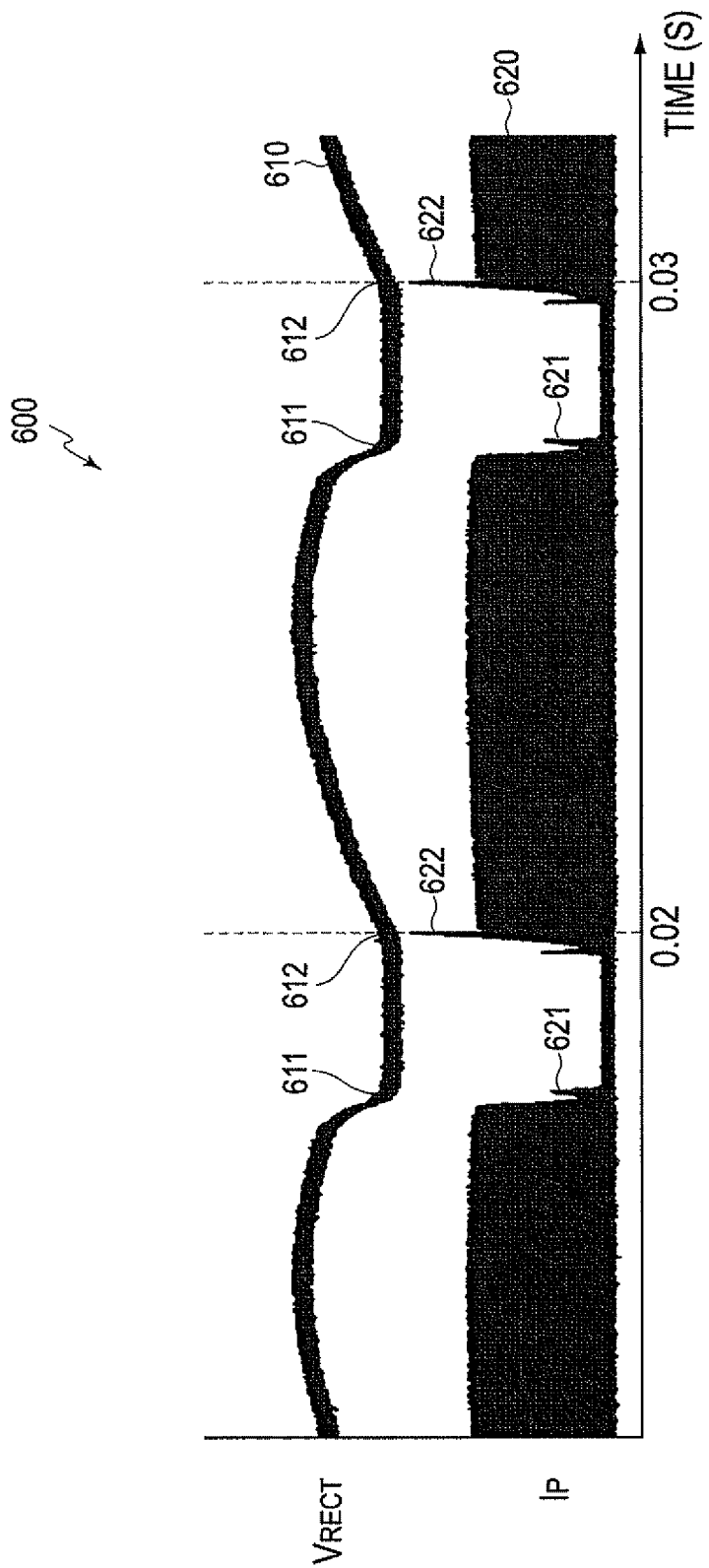
FIG. 6 shows a plot 600 of voltage and current measurements in an electronic system 100 having a trailing edge TRIAC 164.

FIG. 6 shows a plot 600 of voltage and current measurements in an electronic system 100 having a trailing edge TRIAC 164. The plot 600 includes a first waveform 610 of the rectified voltage $V_{RECT}$, and a second waveform 620 of the sensed current $I_P$.

When the TRIAC 164 is in the TRIAC on state, the rectified voltage $V_{RECT}$ is larger than zero, and the controller 130 provides the PWM signal in a manner to limit a peak value for the current $I_P$. As can be seen, the sensed voltage corresponding to the current $I_P$ has a peak voltage, such as 0.4V.

When the TRIAC 164 turns off, the rectified voltage $V_{RECT}$ is about zero, as can be seen by 611. The sensed voltage is less than, for example 0.25V, for a plurality of pulses, as seen by 621, the controller 130 determines that the TRIAC 164 turns off, and then provides the PWM signal in a manner to sufficiently discharge capacitors.

When the TRIAC 164 turns on, the rectified voltage $V_{RECT}$ increases, as seen by 612, and causes the current $I_P$ to increase, as seen by 622. When the sensed voltage corresponding to the current $I_P$ is larger than a threshold (i.e., 0.6V), as seen by 621, the controller determines that the TRIAC 164 turns on, and then provides the PWM signal in the manner to limit the peak value for the current $I_P$.

Figure 7:
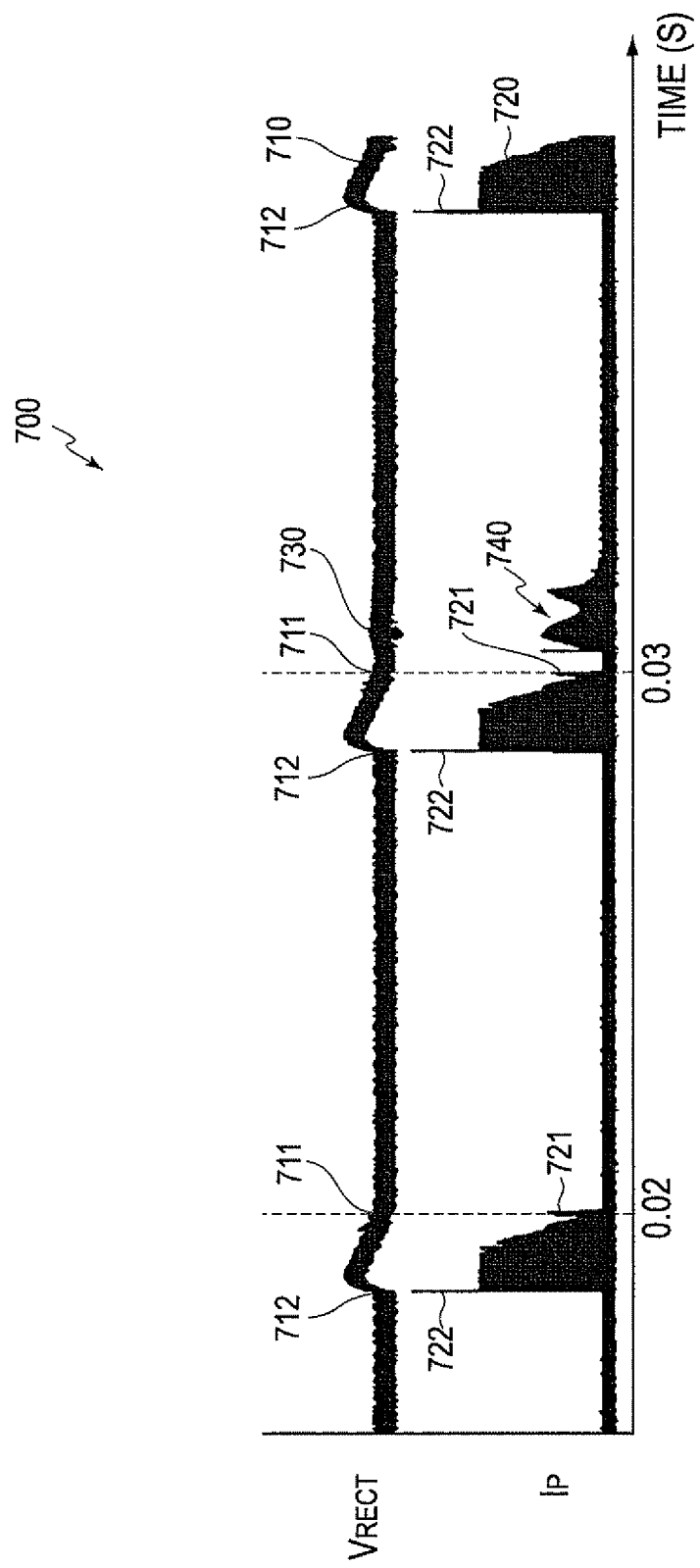
FIG. 7 shows a plot 700 of voltage and current measurements in an electronic system 100 having a Maestro TRIAC 164.

FIG. 7 shows a plot 700 of voltage and current measurement in an electronic system 100 having a Maestro TRIAC 164. The plot 700 includes a first waveform 710 of the rectified voltage $V_{RECT}$, and a second waveform 720 of the sensed current $I_P$.

When the TRIAC 164 is in the TRIAC on state, the rectified voltage $V_{RECT}$ is larger than zero, and the controller 130 provides the PWM signal in a manner to limit a peak value for the current $I_P$. As can be seen, the sensed voltage corresponding to the current $I_P$ has a peak voltage, such as 0.4V.

When the TRIAC 164 turns off, the rectified voltage $V_{RECT}$ is about zero, as can be seen by 711. When the sensed voltage is less than, for example 0.25V, for a plurality of pulses, as seen by 721, the controller 130 determines that the TRIAC 164 turns off, and then provides the PWM signal in a manner to sufficiently discharge capacitors.

When the TRIAC 164 turns on, the rectified voltage $V_{RECT}$ increases, as seen by 712, and causes the current $I_P$ to increase, as seen by 722. When the sensed voltage corresponding to the current $I_P$ is larger than a threshold (i.e., 0.6V), as seen by 721, the controller 130 determines that the TRIAC 164 turns on, and then provides the PWM signal in the manner to limit the peak value for the current $I_P$.

In addition, the TRIAC 164 charges the remote control receiver 160 during a dedicated time duration. During the time duration, the rectified voltage $V_{RECT}$ is non-zero, as seen by 730, and causes the sensed voltage corresponding to the current $I_P$ to increase as well, as seen by 740. In an example, the current $I_P$ is relatively small, and the sensed voltage is less than the threshold (i.e., 0.6V). The controller 130 determines the TRIAC 164 is still in the TRIAC off state.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for controlling a circuit, comprising:
   receiving a sensed signal corresponding to a current flowing through an energy transfer module in response to an on/off state of a forward-type triode for alternating current (TRIAC), the TRIAC having at least three phases, a first phase dedicated to the TRIAC on state, a second phase dedicated to the TRIAC off state, and a third phase dedicated to charge a part of the TRIAC that wirelessly communicates with a control component external to the TRIAC, the third phase occurs at least once per each alternating current (AC) cycle of the TRIAC, the first, second, and third phases being non-overlapping, wherein a full range of the AC cycle of an interval from 0 to $2\pi$ has a first phase range of an interval from 0 to $\beta$ dedicated to charge the part of the TRIAC, a second phase range of an interval from $\beta$ to $\alpha$ dedicated to the TRIAC off state, a third phase range of an interval from $\alpha$ to $\pi$ dedicated to the TRIAC on state, a fourth phase range of an interval from $\pi$ to $(\pi+\alpha)$ dedicated to the TRIAC off state, and a fifth phase range of an interval from $(\pi+\alpha)$ to $2\pi$ dedicated to the TRIAC on state, the first, second, third, fourth, and fifth phase ranges being non-overlapping;
   determining the TRIAC on/off state based on the sensed signal; and
   controlling the energy transfer module based on the determined TRIAC on/off state.

2. The method of claim 1, wherein determining the TRIAC on/off state based on the sensed signal further comprises:
   providing the sensed signal to a state machine that transitions between the TRIAC on state and the TRIAC off state based on the sensed signal.

3. The method of claim 1, wherein controlling the energy transfer module based on the determined TRIAC on/off state further comprises:
   providing the pulse width modulation (PWM) signal to control a switch of the energy transfer module.

4. The method of claim 1, wherein controlling the energy transfer module based on the determined TRIAC on/off state further comprises:
   controlling the energy transfer module to maintain a minimum current for the TRIAC when the determined state is the TRIAC on state.

5. The method of claim 4, further comprising:
   controlling the energy transfer module to limit a peak current when the determined state is the TRIAC on state.

6. The method of claim 1, wherein controlling the energy transfer module based on the determined TRIAC on/off state further comprises:
   controlling the energy transfer module to discharge a capacitor when the determined state is the TRIAC off state.

7. A circuit including a controller configured to:
   receive a sensed signal corresponding to a current flowing through an energy transfer module in response to an on/off state of a forward-type triode for alternating current (TRIAC), the TRIAC having at least three phases, a first phase dedicated to the TRIAC on state, a second phase dedicated to the TRIAC off state, and a third phase dedicated to charge a part of the TRIAC that wirelessly communicates with a control component external to the TRIAC, the third phase occurs at least once per each alternating current (AC) cycle of the TRIAC, the first, second, and third phases being non-overlapping, wherein a full range of the AC cycle of an interval from 0 to $2\pi$ has a first phase range of an interval from 0 to $\beta$ dedicated to charge the part of the TRIAC, a second phase range of an interval from $\beta$ to $\alpha$ dedicated to the TRIAC off state, a third phase range of an interval from $\alpha$ to $\pi$ dedicated to the TRIAC on state, a fourth phase range of an interval from $\pi$ to $(\pi+\alpha)$ dedicated to the TRIAC off state, and a fifth phase range of an interval from $(\pi+\alpha)$ to $2\pi$ dedicated to the TRIAC on state, the first, second, third, fourth, and fifth phase ranges being non-overlapping;
   determine the TRIAC on/off state based on the sensed signal; and
   control the energy transfer module based on the determined TRIAC on/off state.

8. The circuit of claim 7, wherein the controller further comprises:
   a state machine that transitions between the TRIAC on state and the TRIAC off state based on the sensed signal.

9. The circuit of claim 7, wherein the controller is configured to provide the pulse width modulation (PWM) signal to control a switch of the energy transfer module.

10. The circuit of claim 7, wherein the controller is configured to control the energy transfer module to maintain a minimum current for the TRIAC when the determined state is the TRIAC on state.

11. The circuit of claim 10, wherein the controller is configured to control the energy transfer module to limit a peak current when the determined state is the TRIAC on state.

12. The circuit of claim 7, wherein the controller is configured to control the energy transfer module to discharge a capacitor when the determined state is the TRIAC off state.

13. An apparatus, comprising:
   an energy transfer module configured to transfer electric energy received via a forward-type triode for alternating current (TRIAC) to an output device;
   a current sensor configured to sense a current flowing through the energy transfer module; and
   a controller configured to determine a TRIAC on/off state based on the sensed current and control the energy transfer module based on the determined TRIAC on/off state, the TRIAC having at least three phases, a first phase dedicated to the TRIAC on state, a second phase dedicated to the TRIAC off state, and a third phase dedicated to charge a part of the TRIAC that wirelessly communicates with a control component external to the TRIAC, the third phase occurs at least once per each alternating current (AC) cycle of the TRIAC, the first, second, and third phases being non-overlapping, wherein a full range of the AC cycle of an interval from 0 to $2\pi$ has a first phase range of an interval from 0 to $\beta$ dedicated to charge the part of the TRIAC, a second phase range of an interval from $\beta$ to $\alpha$ dedicated to the TRIAC off state, a third phase range of an interval from $\alpha$ to $\pi$ dedicated to the TRIAC on state, a fourth phase range of an interval from $\pi$ to $(\pi+\alpha)$ dedicated to the TRIAC off state, and a fifth phase range of an interval from $(\pi+\alpha)$ to $2\pi$ dedicated to the TRIAC on state, the first, second, third, fourth, and fifth phase ranges being non-overlapping.

14. The apparatus of claim 13, wherein the controller further comprises:
   a state machine that transitions between the TRIAC on state and the TRIAC off state based on the sensed signal.

15. The apparatus of claim 13, wherein the controller is configured to control the energy transfer module to maintain a minimum current for the TRIAC when the determined state is the TRIAC on state.

16. The apparatus of claim 15, wherein the controller is configured to control the energy transfer module to limit a peak current when the determined state is the TRIAC on state.

17. The apparatus of claim 13, wherein the controller is configured to control the energy transfer module to discharge a capacitor when the determined state is the TRIAC off state.

* * * * *